United States Patent Office 3,447,265
Patented June 3, 1969

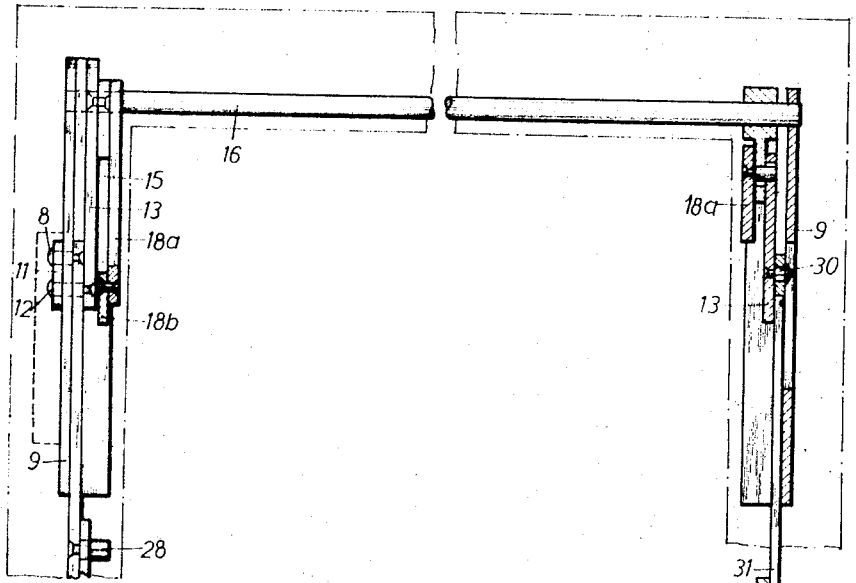
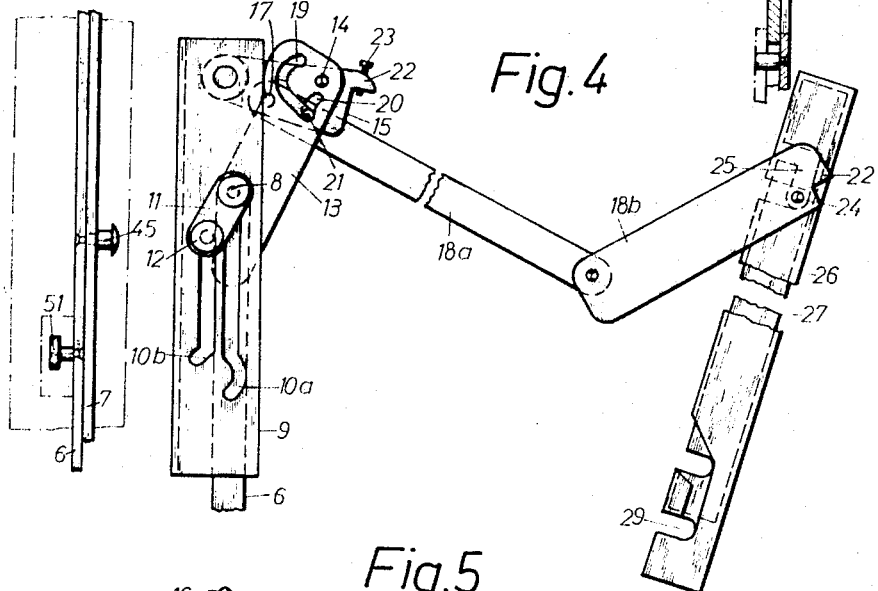
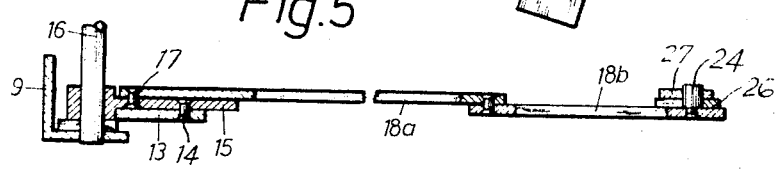

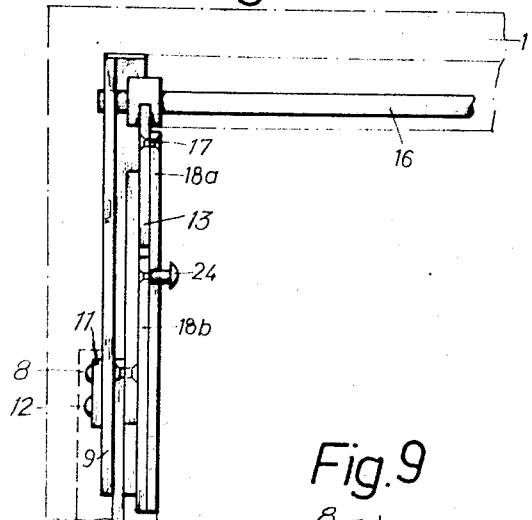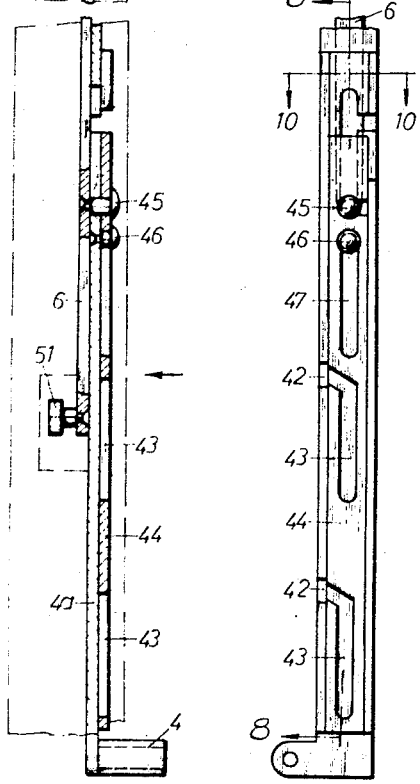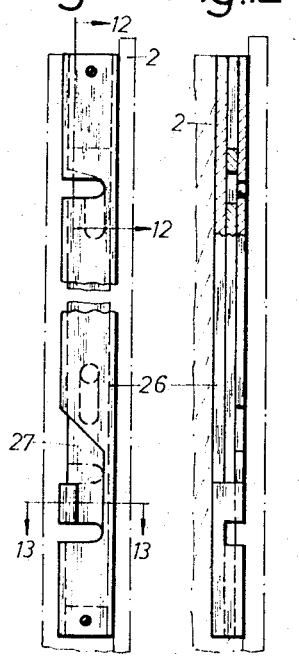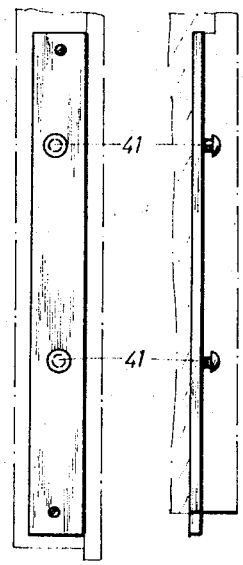

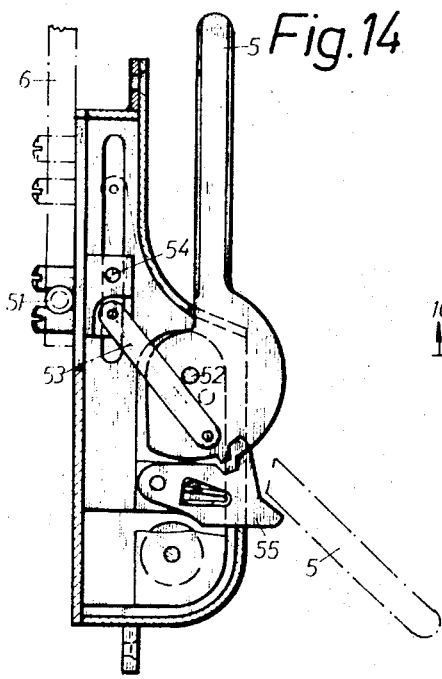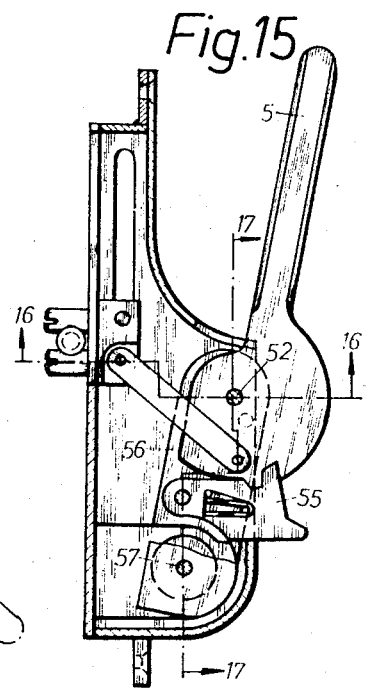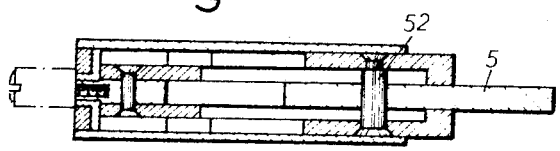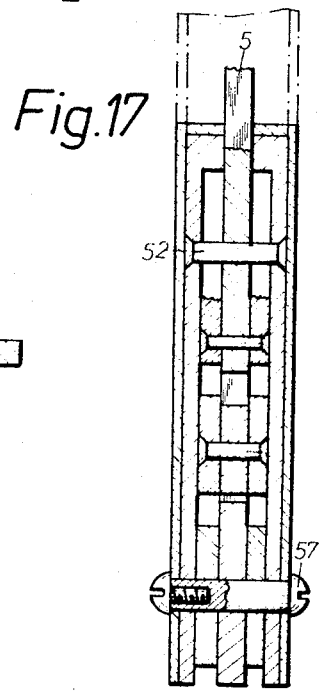

3,447,265
FITTING FOR TIPPING AND SWINGING OF WINDOWS OR THE LIKE
Wilhelm Weber, 4 Nymphenburger Strasse, 1 Berlin 62, Germany
Filed June 21, 1967, Ser. No. 647,850
Claims priority, application Germany, June 22, 1966, W 41,832
Int. Cl. E05d 15/52, 15/50
U.S. Cl. 49—192
11 Claims

ABSTRACT OF THE DISCLOSURE

A fitting for tipping a window or the like including an immovable frame and a wing, which comprises a cross shaft having a laterally projecting arm and including a cross shaft lever. The cross shaft is disposed in the frame and covered by the wing. An operation lever is secured to the frame on the closing side of the latter. A control rod is guided in the frame and connected with the cross shaft lever. The control lever has a first control slot. The cross shaft lever has a second control slot. A control bolt projects through the first and second control slots. The projecting arm is pivotally connected with the control lever and forcibly guided by the control bolt in the first and second control slots.

---

The present invention relates to a fitting for tipping and swinging of windows or the like, in general, and to a fitting for tipping and swinging of windows or the like comprising an immovable frame and windows or the like consisting of a casement or wing having a cross shaft which includes lateral projecting arms and being covered up in the frame of the casement, and an operating lever having a control rod and secured on the closing side of the frame.

The known fittings of this type comprise a plurality of individual parts, which are partly visible on the frame, or are pivoted from across shaft having stiff arms. Furthermore, the known fittings are not safe or are insufficiently safe against faulty operation, because the swinging and tipping movements of the casement or wings are controlled by two different service levers operated independently from each other.

It is one object of the present invention to provide a fitting for tipping and swinging of windows or the like, which comprises the least number of individual parts and which can be built invisible in the channel of the frame and the wing, respectively, in the closed position of the window.

It is a further object of the present invention to provide a fitting for tipping and swinging of windows or the like, wherein the fitting is designed such, that the tipping movements of the wing, as well as the swinging movements of the wing are controlled by a simple service lever.

It is also an object of the present invention to provide a fitting for tipping and swinging of windows or the like, wherein the wing is forcibly controlled by a particular cam guide.

It is still another object of the present invention to provide a fitting for tipping and swinging of windows or the like, wherein the drawbacks of the structures of the prior art are removed.

Starting with the known fittings for windows or the like comprising an immovable frame and a wing with a cross shaft having lateral projecting arms and invisibly disposed in the frame of the wing and a service lever with a control rod secured on the closing side of the frame, the problem on which the present invention is based is solved such, that the control rod guided in the frame is connected by means of a control lever with a cross shaft lever of the cross shaft and wherein the projecting arm is pivoted to the control lever and is forcibly guided with a control bolt simultaneously in a control slot of the control lever and in a control slot of the cross shaft lever. This arrangement can be provided equally on both sides of the wing, whereby at the abutment side the control lever can control hinge bolts or the like by means of a control rod, joint bolt or the like.

The tipping fitting, designed in accordance with the present invention, has the advantage, that the individual parts, the control rod, the control lever, the cross shaft lever and the projecting arm can be arranged or disposed adjacent each other between the channels of the frame and of the wing. In the closed position of the wing, aside of the swinging and tipping bearings and the service lever, all fitting parts are covered up. The fitting, designed in accordance with the present invention, can be additionally also mounted afterwards on already present windows and can be used for windows having large areas. A further advantage resides in the fact, that two extending arms operate as knee-levers and the setting force attacking on the control lever can be very small.

In a practical embodiment of the tipping fitting designed in accordance with the present invention, the cross shaft lever and the extending arm can be equipped with closing noses overlapping the closing position, in order that the wings can be pulled strongly towards the frame in the closing position. Furthermore, it has been found suitable to provide a small set screw in the closing nose of the cross shaft lever, with which the small tolerances which cannot be avoided during the mounting and the torsion of the cross shaft can be balanced out.

Furthermore, it has also been found suitable to guide the control lever and the control rod with a bolt in a bearing plate secured to the frame, which bearing plate simultaneously also serves for the support of the cross shaft.

The tipping fitting, designed in accordance with the present invention, can be formed by using a service lever with three operating positions also to the swinging of the wings. In order that such a swinging and tipping fitting can be controlled by the service lever with three different operative positions, the extending arm is pivoted with a catching bolt on a closing rail disposed on the wing, into which closing rail a bolt of the control rod engages, upon which the sole service lever is effective.

Swinging and tipping fittings with a tipping arm pivoted on the tipping axis to the frame and selectively connectable with the wing are designed, in a preferred embodiment, such, that in the tipping arm a closing rail with catching slots for bolts secured in channels of the wing are arranged. This closing rail can, in turn, be controlled by a bolt from the control rod, on which control rod the service lever is effective. Since the coupling of the tipping arm takes place during the closed position of the wing, the control rod of the service lever can be moved also without simultaneous operation of the projecting device. For this reason, the control rod is not directly conected with the control lever, rather by means of a connecting strip.

Furthermore, suitably two slots with curve-shaped lower ends are provided in the bearing sheet, so that the control rod is swingable in the closed position of the wing with the connecting strip about the resting control lever.

With these and other objects in view, which will become apparent in the following detailed description, the present invention will be clearly understood in connection with the accompanying drawings, in which:

FIG. 3 is a front elevation of the parts disposed in the upper portion of the frame of the swinging and tipping fitting, partly in section;

FIG. 4 is a side elevation of the same parts as shown in FIG. 3, however, the wing being in tipped position;

FIG. 5 is a top plan view of FIG. 4;

FIG. 6b discloses the same parts as those shown in FIG. 6a during the swinging position of the wing;

FIG. 7 is a perspective front elevation of the same window as that shown in FIG. 1, however, with a swinging wing seen from the hand lever side;

FIG. 8 is a section of the parts of the swinging and tipping fitting, respectively, along the lines 8—8 of FIG. 9;

FIG. 9 is a side elevation of the lower section of the fitting seen in the direction of the arrow of FIG. 8;

FIG. 10 is a section along the lines 10—10 of FIG. 9;

FIG. 11 is a top plan view of the upper and lower sections of the wing with the parts of the swinging and tipping fitting secured thereto and shown in swinging position;

FIG. 12 is a side elevation of the same sections as those shown in FIG. 11, partly along the lines 12—12 of FIG. 11;

FIG. 13 is a section along the lines 13—13 of FIG. 11;

FIG. 14 is a side elevation of the service lever for the swinging and tipping fitting with broken-away housing in the closing position;

FIG. 15 is a side elevation of the same service lever disclosed in FIG. 14, however, shown in swinging position;

FIG. 16 is a section along the lines 16—16 of FIG. 15; and

FIG. 17 a section along the lines 17—17 of FIG. 15.

Figure 1:
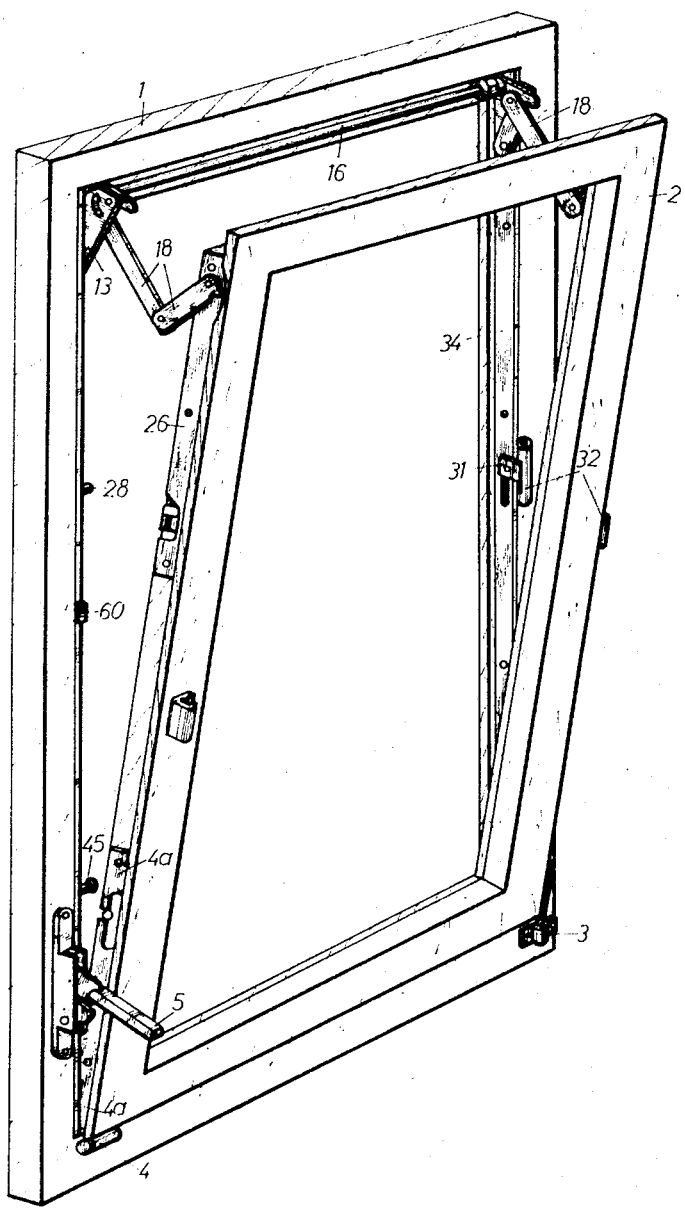
FIGURE 1 is a perspective front view of a window with a tipped wing seen from the hand lever side.

Referring now to the drawings, it will be seen that the present device comprises a rectangular immovable frame 1, to which a wing 2 is disposed swingably (about a vertical axis—FIG. 7) and tippingly (about a horizontal axis—FIG. 1). The weight of the wing supports itself on a swinging and tipping link disposed on the lower abutment side edge. A tipping bearing 4 having a tipping arm 4a is secured on the abutment side below the wing 2 to the frame 1, which tipping arm 4a can be selectively releasably coupled with the wing 2.

Figure 2:
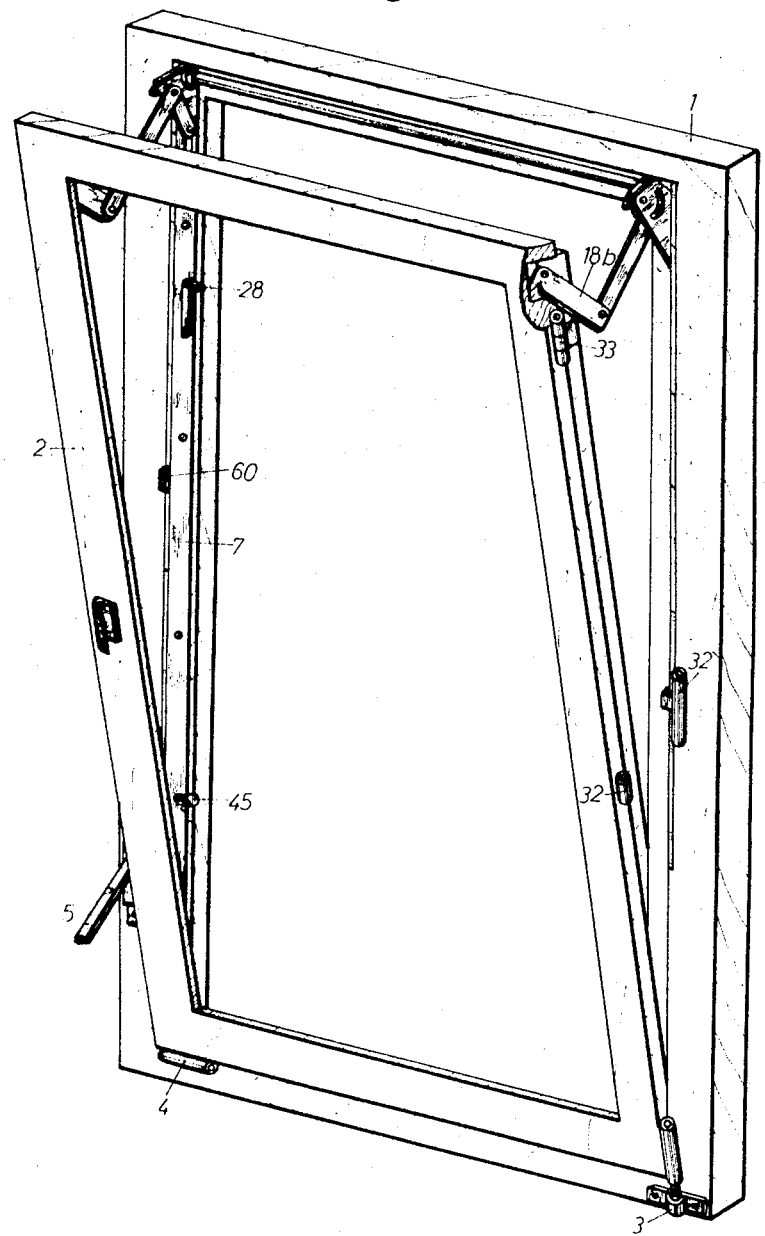
FIG. 2 is a perspective front elevation with a tipped wing seen from the side opposite the hand lever side.

The fitting for swinging and tipping is operated by means of an operating or service lever 5 secured on the closing side of the immovable frame 1, which service lever 5 cooperates with a control rod 6 disposed in a channel of the frame 1. The control rod 6 is covered by means of a clincher rail 7 (FIGS. 2 and 3). The control rod 6 is guided at the upper end by means of a bolt 8 in a bearing sheet 9 secured to the frame 1, in which bearing sheet 9 two slots 10a and 10b with small widenings at the lower end are provided. The bolt 8 is guided in the slot 10a (FIG. 4). The bolt 8 is connected on the outer side of the bearing sheet 9 over a connecting strip 11 with a bolt 12 which is guided in a slot 10b. The bolt 12 is connected with a control lever 13 disposed on the inner side of the control rod 6. The control lever 13 is, in turn, pivoted to a cross shaft lever 15 over a bolt 14, which is secured non-rotatably on a cross shaft 16 situated in the bearing sheet 9.

Figure 6A:
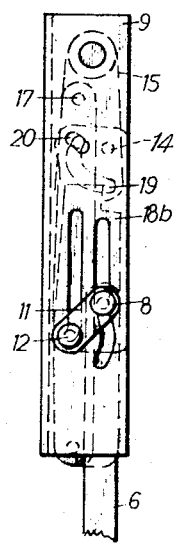
FIG. 6a is a side elevation of the fitting parts disposed on the upper part of the frame during the closed position of the wing.
Figure 6B:
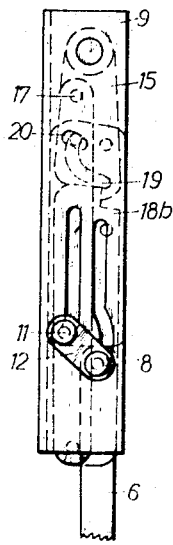

On the cross shaft lever 15 is pivoted, by means of a bolt 17, a two-part projecting arm 18a and 18b. For the control of the two projecting arms 18a and 18b, a closed control slot 19 is provided in the control lever 13 and a control slot 20 is disposed in the cross shaft lever 15, which slots 19 and 20 overlap each other partly in each position and a control bolt 21, secured to the projecting arm 18a below the bolt 17, projects through the slots 19 and 20. The cross shaft lever 15 and the projecting arm 18b have closed noses 22, which overlap each other in their closing position, shown in FIGS. 6a and 6b. In order to set the closing force of the wing 2 exactly, a set screw 23 is provided in the closing nose 22 of the cross shaft lever 15.

The projecting arm 18b is pivoted by means of a catch bolt 24 in a catching slot 25 of the closing rail 27 displaceably disposed in a channel of the wing 2 below a clincher rail 26. The closing rail 27 on the wing 2, is moved by means of a bolt 28 with the control rod 6. For this purpose, a slot 29, open at both ends, is provided and arranged in the moving range of the bolt 28 in the clincher rail 26.

On the abutment side, the control lever 13 is connected by means of a bolt 30 with a control rod 31 for opening and closing a hinge 32. The projecting arm 18b is not pivoted directly to the wing 2 on the abutment side, rather on a hinge 33 (FIG. 2) secured to the wing 2. The control rod 31 is disposed in the channel of the frame 1 below a clincher rail 34.

Figure 7:
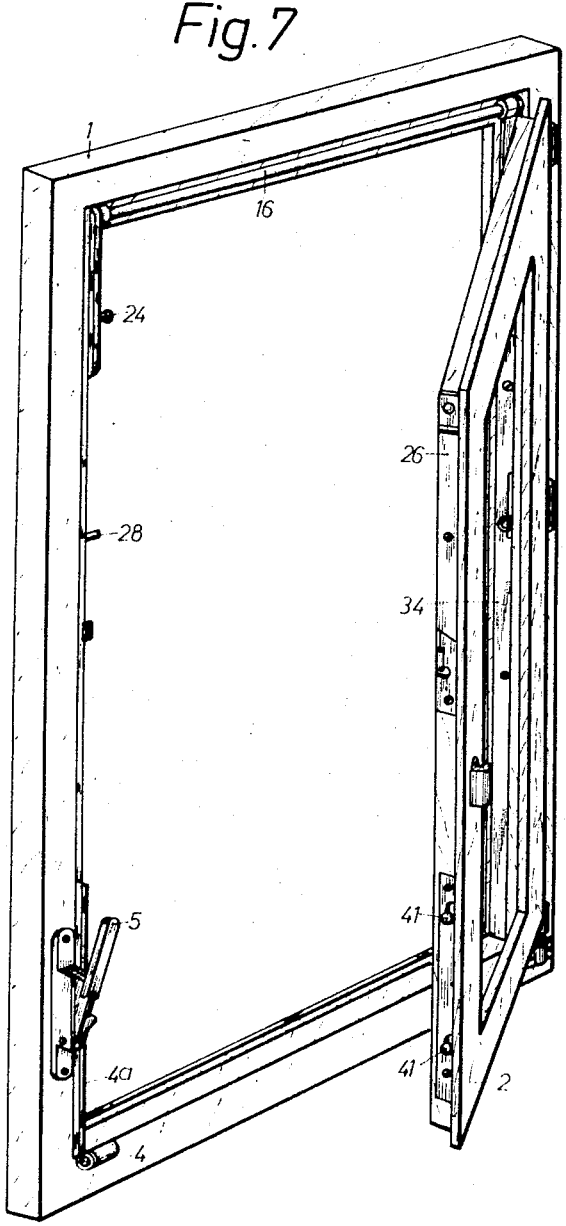

The tipping arm 4a on the tipping bearing 4 is operatively held during tipping of the wing 2 by bolts 41 in the channel of the wing 2 (bolts 41 are shown in FIGS. 7, 11 and 12), which bolts 41 enter slots 42 of the tipping arm 4a and are arrested by means of catching slots 43 of a closing rail 44, which reach around the heads of the bolts 41. The closing rail 44 is mounted on the tipping arm 4a (FIGS. 8, 9 and 10) and is likewise moved by the control rod 6 by a bolt 45. The closing rail 44 is mounted on the tipping arm 4a, by a bolt 46, which runs in a slot 47 of the closing rail 44.

The operation lever 5 operatively engages a drive bolt 51 (FIG. 14) of the control rod 6 and permits three different operating positions. In the closing position, shown in FIG. 14, the operation lever 5 points upwardly and the control rod 6 is disposed in the position shown in FIGS. 6a, 6b and 8 of the drawings. The bolts 8 and 12 are at the start of the curves in the slots 10a and 10b of the bearing sheet 9. For tipping of the wing 2, the service lever 5 is swung downwardly about a link bolt 52, whereby the control rod 6 is displaced by means of a connecting strip 53 and a slide member 54 on the drive bolt 51 upwardly into the tipping positions shown in FIGS. 1, 2 and 4. During displacement of the control rod 6 from the closing position into the tipping position, the closing rail 27 is displaced immediately at the start in upward direction in the channel of the wing 2 disposed on the closing side from the bolt 28, so that the catching slot 25 at the upper end of the swinging bolt 24 is caught in the clincher rail 26. In the closing and tipping positions, the tipping arm 4a is secured by the bolts 41 of the wing 2.

For the swinging of the wing 2, a catch 55 is caught in the service lever 5, if the latter is in the closing position, so that the latter is now rigidly connected by means of intermediate member 56 and can be swung about a link bolt 57 into the position shown in FIG. 15. The slide member 54 is then pulled by the connecting catch 53 in its lowermost end position. The control rod 6 moves the belt 45 and in turn the lower closing rail 44 so far downwardly, that the bolts 41 are freed from the catching slots 43. Simultaneously, the bolt 45 tightly holds the tipping arm 4a and the closing rail 44 in the channel of the frame 1. The wing 2 can then be swung open as indicated in FIG. 7, about hinges 3, 32, and 33.

In order to prevent swinging of the service lever 5 in case the wing is in the open position, that is, from the swinging position into the closing position, and from there into the tipping position, the control rod 6 is locked regularly in case the wing 2 is open by means of a lock 60 against the clinching rail 7 (FIG. 2).

In an embodiment (not shown) of the fittings suitable for tipping only, two operating positions are required for the service lever 5, so that in the bearing sheet 9, one slot 10b can be provided. The control rod 6 is then directly pivoted to the control lever 13 by means of the bolt 12.

While I have disclosed one embodiment of the present invention, it is to be understood that this embodiment is given by example only and not in a limiting sense, the scope of the present invention being determined by the objects and the claims.

I claim:
1. A fitting for tipping a window or the like, including an immovable frame and a wing, comprising
a cross shaft disposed in said frame and covered by said wing,
a cross shaft lever mounted on said cross shaft pivotally relative the axis of said cross shaft,
a control rod movably guided perpendicularly relative said cross shaft in said frame and operatively connected with said cross shaft lever,
a control level pivotally connected operatively to said cross shaft lever and to said control rod,
a projecting arm pivotally connected to said cross shaft lever,
said control lever having a first control slot having a radius at the pivot connecting point of said control lever and said cross shaft lever,
said cross shaft lever having a second control slot,
a control bolt secured to said projecting arm and projecting through said first and second control slots, and
an operating lever means mounted on said frame for moving said control rod, said projecting arm thereby being pivotally connected operatively with said control lever and forcibly guided by said control bolt in said first and second control slots.
2. The fitting, as set forth in claim 1, wherein said cross shaft lever and said projecting arm have closing noses which overlap in a closing position.
3. The fitting, as set forth in claim 2, which includes a set screw disposed in said closing nose of said cross shaft lever.
4. The fitting, as set forth in claim 1, which includes a bearing plate secured to said frame adjacent said control rod,
the upper end of said bearing plate forming a bearing for said cross shaft, and
a bolt means connected to said control rod and said control lever respectively and guided in said bearing plate for operatively pivotally connecting said control lever and said control rod and guiding said control lever and said control rod in said bearing plate.
5. The fitting, as set forth in claim 4, wherein said bolt means includes,
a connecting strip,
a first bolt pivotally connecting one portion of said connecting strip to said control rod,
a second bolt connecting another portion of said connecting strip to said control lever whereby said control rod is connected with said control lever via said connecting strip,
said bearing plate has two slots extending substantially perpendicularly to said cross axis and including curve-shaped ends,
said first and second bolts projecting through and guided by said two slots, respectively, and
said connecting strip is swingable toward said control lever upon movement of said control rod from the closing position.
6. The fitting, as set forth in claim 1, further comprising
a catch bolt mounted on said projecting arm and operatively releasably secured to said wing for releasably pivotally connecting said projecting arm to said wing.
7. The fitting, as set forth in claim 1, which includes a catch bolt secured to said projecting arm,
a closing rail movably disposed on said wing,
said projecting arm is pivotally connected with said closing rail by said catch bolt,
a bolt secured to said control rod, and
said closing rail is movably controllable by said bolt secured to said control rod.

8. The fitting, as set forth in claim 1, further comprising
a tipping arm pivotally mounted to said frame along the tipping axis and including a portion selectively connectable with said wing and said frame, respectively,
first bolts secured to said wing,
a closing rail slidably mounted to said portion of said tipping arm and having catch slots for releasably receiving said first bolts for connecting said portion with said wing for tipping of said wing,
a second bolt secured to said control rod and releasably engaging said closing rail, and
said closing rail is controllable by said second bolt from said control rod.
9. The fitting, as set forth in claim 1, which includes a lock means for locking said control rod and disposed on said frame in the path of movement of said wing.
10. The fitting, as set forth in claim 1, which includes a second cross shaft lever mounted on said cross shaft adjacent an abutment side of said frame,
a second control rod movably guided in said frame,
a second control lever pivotally connected to said second cross shaft lever and to said second control rod,
a second projecting arm pivotally connected to said second cross shaft lever,
said second control lever having a third control slot having a radius at the pivot connecting point of said second control lever and said second cross shaft lever,
said second cross shaft lever having a fourth control slot,
a second control bolt secured to said second projecting arm and projecting through said third and fourth control slots,
a hinge disposed between said second projecting arm and said wing.
11. The fitting, as set forth in claim 1, which includes a second cross shaft lever mounted on said cross shaft adjacent an abutment side of said frame,
a second control rod movably guided in said frame,
a second control lever pivotally connected to said second cross shaft lever and to said second control rod,
a second projecting arm pivotally connected to said second cross shaft lever,
said second control lever having a third control slot having a radius at the pivot connecting point of said second control lever and said second cross shaft lever,
said second cross shaft lever having a fourth control slot,
a second control bolt secured to said second projecting arm and projecting through said third and fourth control slots,
a bolt secured to said second control lever,
a hinge secured to said frame and to said wing, respectively, and
said second control lever is connected with said second control rod by said bolt for opening and closing, respectively, said hinge.

References Cited
UNITED STATES PATENTS 2,866,635 12/1958 Frank _____ 49—192 X
2,969,566 1/1961 Mayer _____ 49—192

FOREIGN PATENTS 1,165,565 6/1958 France.
1,320,673 1/1963 France.
1,391,583 1/1965 France.
1,102,601 3/1961 Germany.

DENNIS L. TAYLOR, Primary Examiner.

U.S. Cl. X.R.

16—147